United States Patent [19]

Trainor et al.

[11] 4,423,084

[45] Dec. 27, 1983

[54] PROCESS FOR PREPARING SALAD DRESSINGS

[75] Inventors: Thomas M. Trainor, Danbury, Conn.; Daniel R. Sullivan, Fort Wayne, Ind.

[73] Assignee: Central Soya Company, Inc., Fort Wayne, Ind.

[21] Appl. No.: 324,643

[22] Filed: Nov. 25, 1981

[51] Int. Cl.³ .............................................. A23L 1/24
[52] U.S. Cl. .................................. 426/589; 426/605; 426/604; 426/613; 426/661
[58] Field of Search .............. 426/604, 605, 589, 613, 426/661

[56] References Cited

U.S. PATENT DOCUMENTS

| | | | |
|---|---|---|---|
| 2,338,083 | 1/1944 | Buchanan et al. | 426/605 |
| 3,093,485 | 6/1963 | Partyka | 426/605 |
| 3,093,486 | 6/1963 | Krett et al. | 426/605 |
| 3,414,413 | 12/1968 | Levin | 426/605 |
| 3,594,183 | 7/1971 | Melnick et al. | 426/605 |
| 3,676,157 | 7/1972 | Wintersdorff | 426/605 |
| 3,764,347 | 10/1973 | Katz | 426/605 |
| 3,892,873 | 7/1975 | Kolen | 426/613 |
| 4,293,574 | 10/1981 | Mikami et al. | 426/613 |
| 4,304,474 | 11/1981 | Mikami et al. | 426/604 |
| 4,304,795 | 12/1981 | Takada et al. | 426/613 |

Primary Examiner—Jeanette M. Hunter
Attorney, Agent, or Firm—Tilton, Fallon, Lungmus & Chestnut

[57] ABSTRACT

An improved process for preparing emulsified dressings including non-specific dressings, salad dressings, and dressings of the mayonnaise type which employs colloid milling to prepare emulsified dressings which possess unique freeze-thaw stability and resistance to mechanical stress.

1 Claim, 3 Drawing Figures

PROCESS FOR PREPARING SALAD DRESSINGS

BACKGROUND OF INVENTION

Salad dressings, seasoned and spiced, slightly acidic vegetable oil-water combinations, have long been used to enhance the taste appeal of raw and cooked vegetables, fruits, sliced or chopped cooked and/or cured meats, cooked fish, cheese, cooked eggs and many combinations thereof. In certain food cultures, salads with dressing are an important part of meal menus.

The so-called emulsified dressings (oil-in-water emulsions) such as mayonnaise, and mayonnaise-like salad dressings, are a substantial segment of the salad dressing market. They enjoy wide utilization. These dressings may be prepared at the point of use, but are most often produced as finished goods for retail, institutional, and food service markets. A growing use is in the production of refrigerated salads for delicatessen, restaurant, and fast food outlets.

The composition and ingredients of mayonnaise and salad dressing are specified in the Code of Federal Regulations (CFR Title 21, Part 169, Subpart B-Sections 169.140 and 169.150). Any dressing that departs from the given standard of identity cannot be called mayonnaise or salad dressing, as the case may be. There are commercially-available products which do not conform to these standards. These are merchandized as simply dressings or are given some fanciful name. In spite of their non-conformity to the cited regulations, these items are widely used and perform useful functions.

Salad dressing is further described as the emulsified semi-solid food prepared from vegetable oil(s), acidifying ingredients, vinegar and or lemon/lime juice, egg yolk or egg yolk-containing ingredients, a starchy paste, and one or more optional ingredients including: (a) salt, (b) nutritive carbohydrate sweeteners, (c) spice or natural flavoring except those which impart an egg-yolk color, (d) monosodium glutamate, (e) stabilizers and thickners, (f) citric/malic acids, (g) sequestrants, and (h) crystallization inhibitors. As indicated above, there are many emulsified dressings which depart from this recipe in one or more ways. Customarily, an emulsion is made from the vegetable oil, egg yolk, water, and certain other ingredients such as vinegar and spices. This emulsion is combined with a cooked starch paste after cooling of the starch paste. The paste may contain the other spicing and flavoring ingredients.

It has been indicated in older literature discussing mayonnaise, that the challenge in making an emulsified oil-in-water dressing is to produce a product which resists "oiling-off" on storage. At one time it was not unusual to see on the retail shelf, or after home storage at room or refrigerated temperatures, a jar of dressing with a yellow oil layer at the top.

With an increasing industry recognition of the effect of the compositional and processing factors on emulsion stability, gross instability such as recited above was overcome, for the most part.

However, changing patterns of marketing, including warehousing, transportation, merchandising, and even utilization, resulted in a demand for dressings of greater stability toward stress environmental conditions. With increasing areas of distribution, the need for frozen dressings became apparent. This prompted investigation of means for the production of freeze-thaw stable dressings. The perfect model is an emulsified oil-in-water dressing which can undergo an infinite number of freezing and thawing cycles in storage, transportation, and use, and yet maintain dressing integrity. Such has not been accomplished, but the challenge remains. Some progress has been made in achieving this goal, but new, innovative technology is needed to approach such an ideal.

Buchanan and Drury, in U.S. Pat. No. 2,338,083, recognized the sensitivity of salad dressings to temperature change with separation of components which they term "weeping". They advocated the use of a waxy maize or a waxy cereal starch as a portion of the starch paste for improved stability. However, they did not address the question of freeze-thaw stability, but were, apparently, concerned with more modest changes in temperature.

Melnick, Gooding and Vahlteich, in U.S. Pat. No. 2,627,469, addressed the question of the "freeze or cold resistance" of mayonnaise. It should be noted that these inventors were concerned with emulsified dressings wherein the water was limited because of the high oil content (mayonnaise-minimum 65% vegetable oil). It has been noted that the behavior of the water during freezing of a dressing is a critical factor in stability. Further, these inventors were concerned with inadvertent freezing of the dressing such as in home refrigerators set too low, and in winter storage and transportation. They claimed that a specific vegetable oil combination resulted in a mayonnaise with marked cold resistance according to their test procedure.

Partyka, in U.S. Pat. No. 3,093,485 (issued June 11, 1963), directly addressed the question of an emulsified salad dressing which is stable under freezing conditions, and can be used in frozen foods such as salads and sandwiches.

Partyka states that the prior art indicated the need to use vegetable oils, such as cottonseed oil, that were free of "winterizable" components, that is, hard fats that separate on chilling the oil(s), for improved resistance of salad dressings to cold stress. Further, he states that the use of oils free of winterizable components have provided certain cold stability, but such does not provide a satisfactory emulsified salad dressing which resists fat separation on freezing.

The essentials of Partyka's alleged invention for an improved freeze-resistant salad dressing included a specified soft oil with winterizable components (iodine value 75 to 115) which clouds when placed in an ice bath for 5.5 hours, a freeze resistant starch to imbide all the water in the dressing and retain the water under freezing conditions, and egg yolk or yolk equivalent at a level of 8 percent of the soft oil in the edible oil.

The importance of the use of freeze-resistant starch in the preparation of the cooked starch paste is emphasized. Partyka states that such starches are known, and are commercially available. He recites such starches as sold under the tradenames, Col-Flo 67 and Freezist. He points out that such starches may be used in starch blends wherein the other starches need not retain water under freezing conditions, though the resulting starch gel or paste after cooking should be freeze resistant.

Another important statement of Partyka is "It is well known in the art that various pieces of mechanical equipment effect tighter emulsions. However, the mechanical conditions of emulsification have not been found to provide any unusual advantages in respect of the freeze stability of the emulsified salad dressing. Therefore, the selection of the particular equipment is largely a matter of choice to provide a dressing body of desired characteristics." (U.S. Pat. No. 3,093,485; column 3, lines 6–13).

The teaching of Krett in U.S. Pat. No. 3,093,486 for the production of a freeze-thaw stable salad dressing with edible oil comprising more than about 5 percent and less than about 35 percent of the dressing also emphasizes the use of a freeze-resistant starch. Wintersdorff, in U.S. Pat. No. 3,676,157, claims a spoonable (thick) salad dressing containing about 30 percent to about 70 percent edible oil with improved freeze-stability by the incorporation of a Xanthomonas hydrophilic colloid in a specific procedural process.

The foregoing is a summary of the prior art on certain essentials in the production of freeze resistant mayonnaise, and emulsified salad dressings and dressings. More recently there has been an increasing demand for freeze-thaw stable emulsified salad dressings. This has resulted from the significant increase in away-from-home eating in restaurants, particularly fast-food outlets. Institutional feeding is another growth factor in the demand-market structure. Another factor in demand is the growing delicatessen market. These markets are making demands on convenience foods and food ingredients, including emulsified salad dressings for the preparation of salads and sandwich spreads, particularly those containing ham, chicken, and tuna.

Changing patterns of marketing and distribution have emphasized the need for dressings with even greater freeze-thaw stability as exemplified by stability or emulsion integrity after numerous freeze-thaw cycles. In addition, the need for dressings with resistance to mechanical stress has become apparent. Such stress occurs through the "spooning" and mixing of the thawed dressing. It is not unusual to see a dressing which appears uniform after quiescent thawing, but which breaks down with liberation of oil on mixing. This has not been particularly addressed in the prior art.

SUMMARY OF THE INVENTION

We have discovered a process whereby emulsified salad dressings and other emulsified dressings with superior freeze-thaw stability and excellent resistance to mechanical stress can be prepared. In contrast to prior art, freeze-resistant starch is not required in our process; however, it can be used if desired. This latter option has no impact on superior quality of the products of our invention. In fact, salad dressing starches which are not recommended for frozen products by the manufacturer can be used in our novel process.

Further, we have discovered that colloid milling, as used in our process, is an important factor in achieving superior freeze-thaw stability and resistance to mechanical stress, with retension of good body of the resulting dressing. Again, this is in direct contrast to prior art as recited above.

Our novel process is essentially as follows:

First, a starch base composed of starch, water, salt, sugar, and vinegar is cooked to a paste as in conventional processes. Spices may be added prior to or after the cooking operation. However, as recited above, freeze-resistant starch is not a mandatory component of the starch paste. We have discovered that various starches, even those not recommended for frozen systems may be used. The starch-containing mixture is cooked to about 195° F. or higher and cooled to less than or about 90° F.

Another aqueous mixture is made to contain gum and optional ingredients such as spices, natural, and artificial flavors, preservatives, emulsifier-stabilizers and the like. This is mixed to dissolve water-soluble ingredients and to hydrate water insoluble ingredients. Then the starch base and mandatory egg yolk or egg yolk equivalent are added with additional vinegar, if desired, and mixing continued for a few minutes. Then, the normally chilled (40°–55° F.) liquid vegetable oil (e.g., refined soybean salad oil) is added and mixing continued to form a loose emulsion. During this mixing operation, the temperature drops to about 60° F., or thereabout. The resulting emulsion is then put through a colloid mill. During milling, the temperature rises about 8°–12° F. Colloid milling is an important aspect of our discovery. In prior art, the starch base has been added after the milling of the liquid vegetable oil, and egg yolk emulsion. We feel that the colloid milling of the starch base with the liquid oil and egg yolk is a critical factor in the unusual freeze-thaw stability and resistance to mechanical stress of dressings made according to our novel process.

The finished dressing is produced by mixing into the colloid-milled base, the required amount of a heated partially hydrogenated oil (Iodine Value 75-105). The partially hydrogenated oil is heated to about 115°–130° F. After mixing to form a uniform composition, the product is filled into containers, refrigerated for about 48 hours and then frozen if desired or maintained under refrigeration.

In summary, we have discovered a process whereby we can make superior freeze-thaw stable, mechanical-stress resistant salad dressings and dressings to meet current market demand.

This is explained in conjunction with the drawing in which.

DETAILED DESCRIPTION OF THE INVENTION

The above summary of out discovery recites the essentials of our invention. Hereinafter it is our purpose to recite the details of our invention.

This invention is concerned with salad dressings which conform to the Federal Standard of Identity (Code of Federal Regulations, Part 169, Subpart B, Section 169.150) and to dressings which depart from this standard for one or more reasons. In the main, these departures are due to the incorporation of non-critical ingredients such as coloring agents, flavoring agents, preservatives and the like, which are not a part of the recipe recited in the Federal Regulations. Mayonnaise, as described in the Federal Regulations, is not within the scope of this invention.

Salad dressing is clearly described in the Code of Federal Regulations as "emulsified semi-solid food prepared from vegetable oil(s), one or both of the acidifying ingredients specified in paragraph (b) of this section, one or more egg yolk-containing ingredients specified in paragraph (c) of this section and a starch paste prepared as specified in paragraph (d) of this section. One or more of the ingredients in paragraph (e) of this section may also be used. The vegetable oil(s) used may contain an optional crystallization inhibitor as specified in paragraph (e) (8) of this section. All the ingredients from which the food is fabricated shall be safe and suitable. Salad dressing contains not less than 30 percent by weight of vegetable oil and not less egg yolk-containing ingredient than is equivalent in egg yolk solids to 4 percent by weight of liquid egg yolks. Salad dressing may be mixed and packed in an atmosphere in which air is replaced in whole or in part by carbon dioxide or nitrogen."

As recited above, useful dressings may depart from this recipe in one way or another, but these be called salad dressings. Further, this invention is concerned with emulsified salad dressings and emulsified dressings which have superior freeze-thaw stability, and exceptional resistance to such mechanical stress as may be encountered during conventional utilization.

In direct contrast to prior art, we have discovered that through a novel sequency of processing steps, a dressing with the claimed attributes can be prepared.

Figure 1:
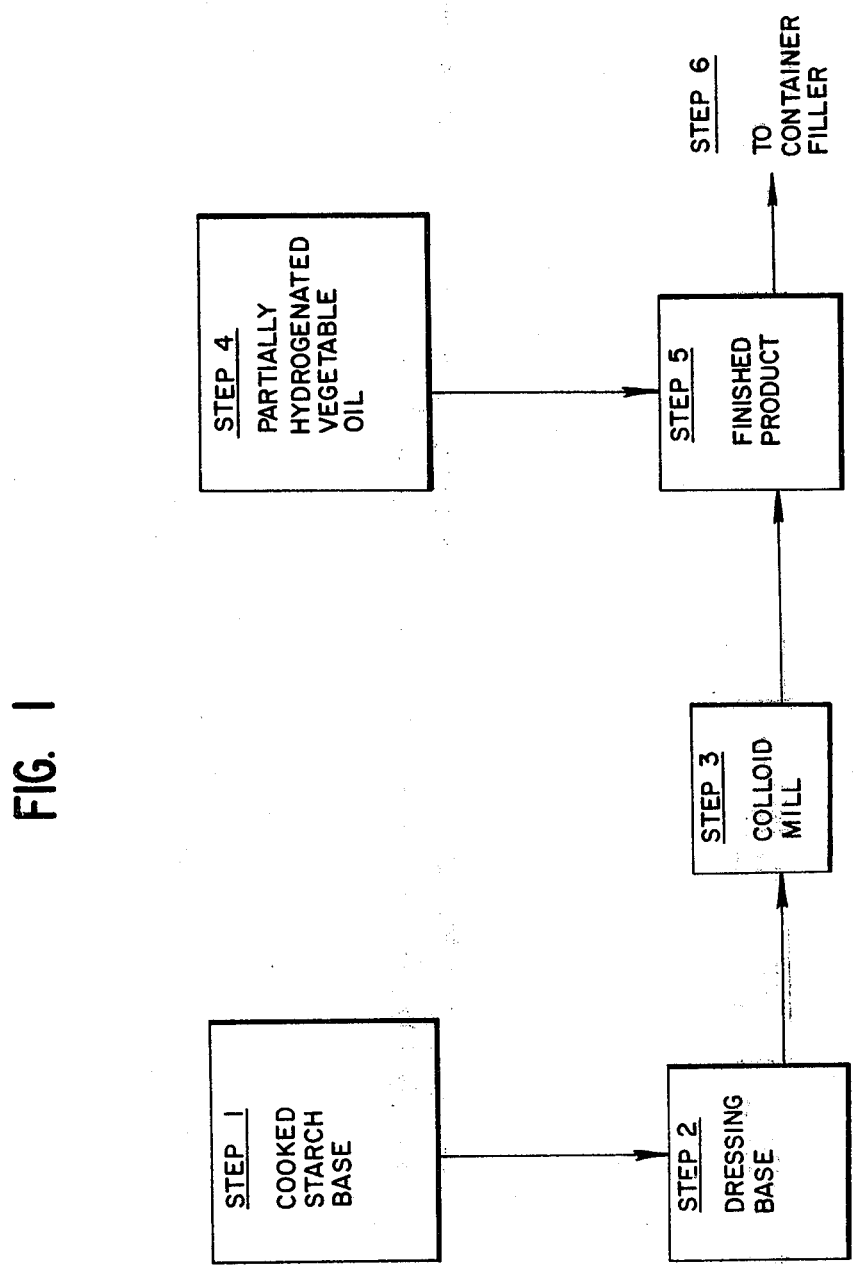
FIG. 1 is a schematic diagram.

Our process and sequence of processing steps are depicted in FIG. 1 wherein the flow of major ingredient mixes is shown in block diagram. It is our purpose to explain the critical and non-critical ingredients, and the critical processing according to the numbered flow of FIG. 1.

The prior art indicates the importance of a starch base in the preparation of any salad dressing or dressing.

For our invention, any one of a number of commonly available food-grade starches may be employed. As indicated earlier, these need not be the special freeze-resistant starches recited in the prior art. The common food-grade starches used in this invention are derived from corn, sorghum, tapioca, wheat, etc. These are usually modified to improve rheological properties by (a) oxidation, (b) acid-catalyzed conversion, (c) cross-linking by organic or inorganic chemicals, and the like. The type of modification is not critical to this invention.

In our invention a starch paste is prepared in Step 1 (FIG. 1) as in conventional processes. The ingredients are starch and water; salt, sugar, and vinegar may be added as in conventional processing. Cooking of the paste is accomplished in a steam jacketed-water cooled kettle fitted with a swept-surface agitator or in a heat exchanger, e.g., a swept-surface type with heating and cooling sections. In kettle cooking, obviously, the time for warm-up and cooling is longer than cooking in swept-surface exchangers; the time varies from about 17 minutes for the kettle with 2 minute hold-time at about 195° F., to a much shorter time (about 32 seconds) up to about 205° F. in a swept-surface exchanger unit. It is cooled in the cooling section in about the same time. The conditions for preparing the starch paste are not a part of this invention and follow conventional practices. The paste is cooled to about 100° F. or thereabouts. This can vary considerably.

Another aqueous mixture is prepared for making the dressing base. This contains the optional ingredients such as spices, natural and artificial flavors, permissible coloring or whitening agents if not intended to simulate egg yolk color, preservatives, emulsifiers stabilizers, and others. Emulsifiers may include approved polysorbates, and stabilizers may include a variety of gums. The gums, together with the starch, eggs, and oil, confer the proper viscosity to the final dressing. Usually, a *final dressing* viscosity of about 50,000-250,000 cps is desired (Brookfield Model RTV, Helipath; T-D spindle, 5 RPM) for overall performance qualities. The useful gums include xanthan, alginates, tragacanth, locust, guar and others. The aqueous mixture is agitated to dissolve the water-soluble constituents and to hydrate other constituents. Then, the starch base, described above, and mandatory egg yolk or egg yolk equivalents are added, and mixing is continued for a few minutes.

Liquid salad grade vegetable oil is then added, and mixing is continued. Although the majority of examples illustrating this invention are centered on refined soybean oil, other vegetable oils may be used. These oils include, (a) cottonseed oil (iodine value or IV of 99-113), sunflower oil (IV 125-136), corn oil (IV 103-128), and safflower oil (IV 140-150). Soybean salad oil has an IV in the range 120-141. The iodine value referred to here is determined according to the American Oil Chemists Official Method Ca I-25.

The mixing (FIG. 1, step 2) of the dressing base is done in any suitable mixing device such as a Hobart kettle, a Dixie Mixer (Bran and Lubbe), a Waukesha mixer, or the like and is continued for about one to four minutes. The temperature of the mix may vary from 60°-90° F. It is then pumped to a colloid mill (FIG. 1, Step 3). In spite of comments in the most pertinent prior art, colloid milling is critical in our invention. Further novelty and criticality reside in milling the total dressing base containing the starch base, egg yolk or egg yolk equivalents and the salad oil.

Colloid milling is accomplished in mills such as a Charlotte mill (Chemi Colloid Laboratories, Inc.) or a Waukesha mill. In the conventional mill, the rotor and stator are adjusted to a clearance of about 0.020 to about 0.080 inches with the mid range being more advantageous. From the colloid mill, the dressing base is pumped to a clean mixer such as the Hobart Kettle or the Dixie Mixer described above.

With good agitation, heated partially hydrogenated vegetable oil, IV of 75-105 and at temperature of 125° F. or thereabouts, is gradually added. After the addition, the dressing is mixed for about 2 to 4 minutes. At this stage (FIG. 1, Step 5) the temperature of the mix is somewhat below 100° F. The finished dressing is then pumped to a filler (FIG. 1, Step 6) where it may be filled into containers of a variety of sizes and shapes depending upon commercial demands.

As indicated in the prior art, the composition of emulsified dressing can vary considerably, ranging from products conforming to Federal Standards of Identity (salad dressing) to products which do not conform and must be labeled and merchandised simply as dressing, imitation salad dressing, or some fanciful name.

In Table 1 are listed typical ingredients for an emulsified dressing. We have established that the range and preferred range by weight percent are as listed. In addition, a notation is made whether the ingredient is critical (C) or non-critical (N) for the character of the dressing. It should be noted that the criticality of ingredients of the dressing does not involve freeze-thaw stability and resistance to mechanical stress along. Ingredients and their concentration have an impact on body, texture, and mouthfeel. Further, certain so-called non-critical ingredients contribute to taste appeal and product recognition by the consumer.

TABLE 1

| | Weight Percent | | |
|---|---|---|---|
| Ingredient | Range | Preferred Range | Criticality |
| Food Starch - Modified | 1-8 | ca 3.0 | C |
| Water | 30-70 | 35-55 | C |
| Salad Grade Vegetable Oil | 5-30 | 10-20 | C |
| Partially Hydrogenated Vegetable Oil; IV 75-105 | 0-20 | 10-20 | C |

TABLE 1-continued

| Ingredient | Weight Percent Range | Preferred Range | Criticality |
|---|---|---|---|
| Egg Yolk or Yolk Equivalents[a] | 2–10 | 3–8 | C |
| Gum(s)[b] | 0.05–1.0 | 0.2–0.6 | C |
| Sweetener(s)[c] | 0.0–15.0 | 3.0–9.0 | N |
| Salt | 0.0–4.0 | 1.0–3.0 | N |
| Preservatives[d] | 0.0–0.2 | 0.1–0.2 | N |
| Emulsifiers[e] | 0.0–0.2 | 0.1–0.2 | N |
| Spices, Flavors, and Colors[f] | 0–0.15 | 0.09–0.11 | N |
| 120 Grain Vinegar and/or Acidulants[g] | 1–15 | 5–10 | C |

[a]The liquid egg yolks may be fresh, salted, frozen salted, refrigerated, pasteurized, sugared egg yolks. Whole eggs (white and yolk) in its several forms may be used as long as the yolk content conforms to regulations.
[b]These have been recited earlier in the description of this invention.
[c]The sweeteners may include sucrose, dextrose, high-fructose corn syrup, and others. Sweeteners and other flavors are needed for enhanced taste appeal.
[d]Preservatives include sodium benzoate, potassium sorbate or others at prescribed or regulated levels.
[e]Emulsifiers include such items as Polysorbate 60, other Polysorbates, and other emulsifiers which are compatible with required performance.
[f]Colors are permissible as long as they do not simulate egg yolk color. Whitening agents such as food grade titanium dioxide may be employed in non-standard products. Spices and flavors are needed for consumer taste appeal but are not critical for body and texture.
[g]In addition to vinegar, acidulants may include lemon juice, citric acid, malic acid and others.

It should be noted that the ingredients and levels of use listed in Table 1 are illustrative of dressings, and are not intended to be inclusive insofar as this invention is concerned. As indicated earlier, certain ingredients are critical (C) for body and texture, and others are need for flavor, taste, and, hence, consumer appeal.

A reading of the prior art indicates that several methods have been used in testing the freeze-thaw stability of emulsified dressings. None addressed the question of resistance to mechanical stress after freezing and thawing. The description of conditions of test were quite short without full definition of all conditions. In developing the concept of this invention, we have devised a method which leaves no aspect of the methodology to chance. A description of our method is as follows:

1. Sample Size-Approximately 470 ml (16 fluid oz) of product are placed in a standard (2.75 inches internal diameter and 5 1/16 inches height) pint size (16 oz) and retail shape mayonnaise jar with a standard screw cap.
2. Freezer-A constant temperature freezer held at minus 10° F. (−23° C.) is required.
3. Sample Preparation-After preparation, all samples are stored for a minimum of 48 hours at a temperature between 40°–48° F. before further freeze-thaw testing.
4. Testing Procedure-
   (a) Samples in jars are placed in the freezer and held for 72 hours.
   (b) Samples in jars are then removed and stored at a temperature between 65°–75° F. for 5 hours.
   (c) Samples are then mechanically stressed by rapidly stirring the entire sample with 25 strokes of a standard four-prong kitchen fork.
   (d) Samples are then allowed to stand at ambient temperature (about 75° F.) for one hour and visually inspected for separation of free oil or free water. The presence of free liquid in an amount greater than about one ml is the criterion of whether the dressing is no longer freeze-thaw stable and resists mechanical stress.
   (e) Samples which do not show free liquid are again placed in the freezer for 18 hours. Then steps (a) through (d) are repeated.
   (f) Initial steps (a) through (d) are referred to as cycle 1. Each time step (e) is performed will add an additional cycle. The cycle at which more than 1 ml of free liquid appears is not considered a cycle.

As a result of this test, dressings can be rated according to the number of cycles of freeze-thaw stability and resistance to mechanical stress.

Earlier in this recitation of the invention, it was noted that for consumer image and recognition, the viscosity of the finished dressing was important for typical body and texture. Further, as indicated above, desirable product viscosities may range from 50,000 to 250,000 centipoises (Brookfield Viscometer, Model RTV equipped with Helipath device, T-D spindle, 5 RPM, about 75° F.). In addition, we have discussed that dressings which were too thin or too thick had a tendency to demonstrate poor freeze-thaw stability no matter what process was employed. However, the appropriate balance of thickening agents, starches, and gums is readily ascertained by one skilled in the art of dressing composition. The balance is not a part of this invention.

We have discovered that through the practice of the invention described herein, superior stable dressings can be produced. These dressings are capable of passing freeze-thaw stability and resistance to mechanical stress cycles far in excess of products of the prior art.

The following examples are illustrative of the facets of this invention, and demonstrate the practice of this invention.

EXAMPLE 1

For illustrative and comparative-to-prior-art purposes, a dressing was prepared according to the details of the invention described herein.

The starch base was prepared from the following ingredients:

| INGREDIENTS | WEIGHT, lbs |
|---|---|
| Water | 6.07 |
| Starch[a] | 0.72 |
| Vinegar, 120 grain | 1.37 |
| Sugar | 1.60 |
| Salt | 0.23 |
| Spice | 0.01 |

[a]The starch used in this formulation was Purity 420 (National Starch Co.).

This mixture was heated in a jacketed Hobart kettle equipped with a sweep scraper agitator and steam heating and water cooling. The mixture, with agitation, was heated to about 195° F. in about five minutes, held there for 2 minutes, and cooled in about 10 minutes to about 90° F.

Then a dressing base was prepared with the following ingredients:

| INGREDIENTS | WEIGHT, lbs |
|---|---|
| Starch base (described above) | 3.0 |
| Water | 2.64 |
| Soybean Salad Oil (IV-130) | 1.57 |
| Egg yolk, frozen, salted containing 10% salt | 0.70 |
| Vinegar, 120 grain | 0.30 |
| Salt | 0.90 |
| Xanthan Gum | 0.05 |
| Color (optional)[a] | 0.02 |
| Preservatives (optional)[b] | 0.01 |

-continued

| INGREDIENTS | WEIGHT, lbs |
|---|---|
| Polysorbate 60 (optional)[c] | 0.01 |
| Flavors and spices (to taste) | 0.01 |

[a] Coloring agents other than those which simulate egg yolk color; e.g., food grade titanium dioxide for opacity and whitening.
[b] Sodium benzoate and/or potassium sorbate
[c] An emulsifier These ingredients were mixed in a Hobart mixer as described above. The refined soybean oil was slowly added last. After the addition of all of the liquid oil, the dressing base was mixed for an additional two minutes, and then passed through a small Charlotte colloid mill with a rotor/stator clearance of 0.025 inches at a rate of 11 pounds per minute.

A 5.25 lb portion of the emulsified mixture was placed in a clean Hobart mixer. Then one pound of partially hydrogenated soybean oil (IV-85) at 120° F. was slowly added with high speed agitation. After several minutes of additional mixing, the emulsified dressing was filled into pint screw-cap jars for examination and freeze-thaw testing as described earlier.

This example is illustrative of the order of addition of ingredients and the process step sequence which results in the unique freeze-thaw stability and resistance to mechanical stress of the emulsified dressings of this invention.

Product produced according to this example had a viscosity of 124,000 cps at 45° F. and passed 10-25 cycles of testing as described earlier.

EXAMPLE 2

Dressing products were prepared according to U.S. Pat. No. 3,093,485; Example 3. This is considered the most pertinent prior art.

As noted above, this prior art teaches, in contrast to the teachings of the invention described herein, the use of freeze-resistant starch, a different sequence of steps with regard to ingredient incorporation, and that there is no need for colloid milling.

When these dressings were subjected to the standardized method for freeze-thaw stability and mechanical resistance as described herein, they passed only 4, 7, and 8 cycles for three different preparations.

EXAMPLE 3

In an effort to characterize the product of this invention as contrasted to a product of the most pertinent prior art, photomicrography was utilized.

Samples of emulsified dressing were prepared according to the present invention and according to Example 3 of U.S. Pat. No. 3,093,485. The two samples were stored at 4° C. for several days before examination. After about 5 hours at room temperature, a thin film of each emulsion was spread on individual microscope slides. A cover slip was placed over each test film. Photomicrographs were then taken of each emulsion at 450x magnification. Dark field phase light was used for illumination.

Figure 2:
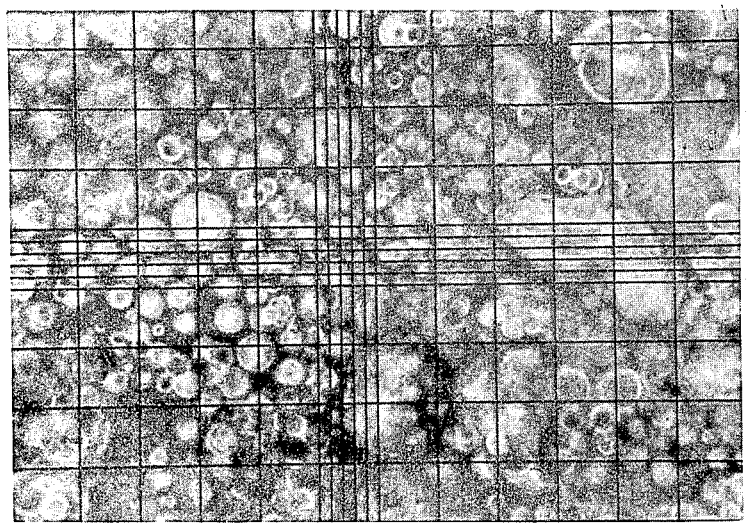
FIGS. 2 and 3 are photomicrographs of dressings made according to the invention and prior art, respectively.
Figure 3:
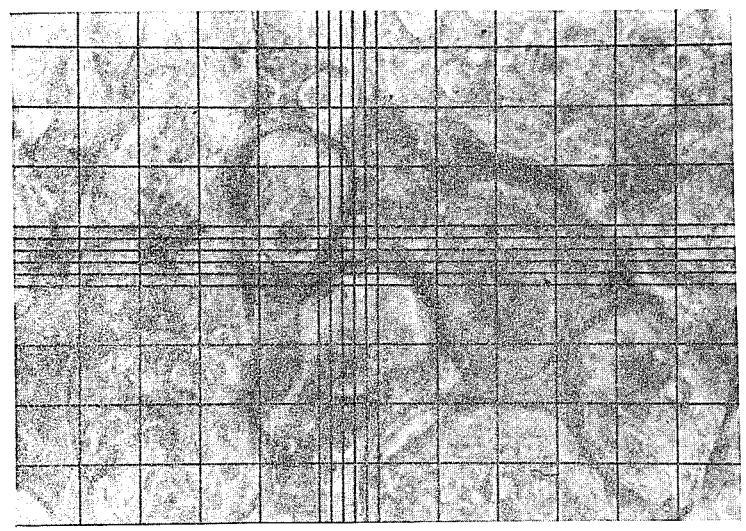

The results of this examination are shown in FIG. 2. The contrast in fat globule size should be noted. The process of the present invention produced a product with a high preponderance of uniformly small globules; whereas, the product of the prior art, cited above, contained large, irregularly shaped globules. This is another manifestation of the unique characteristic of the product of the present invention.

EXAMPLE 4

In order to test the concept of this invention, a small commercial run of dressing was made using typical plant-scale equipment.

The weight and ingredients of the product were as follows:

| INGREDIENT | WEIGHT, lbs | PERCENT OF FINISHED PRODUCT |
|---|---|---|
| Starch Paste | 257 | 30.0 |
| Water | 226 | 26.4 |
| Soybean Salad Oil (IV 130) | 135 | 15.74 |
| 43% egg yolk solids (10% salt) | 60 | 7.0 |
| Vinegar, 120 grain | 25.7 | 3.0 |
| Salt | 7.7 | 0.9 |
| Gum, Xanthan | 4.3 | 0.5 |
| Titanium Dioxide, food grade | 1.3 | 0.15 |
| Sodium Benzoate | 13.7 oz | 0.10 |
| Potassium Sorbate | 6.9 oz | 0.05 |
| Polysorbate 60 | 13.7 oz | 0.10 |
| Mustard Oil Blend, 10% | 6.9 oz | 0.05 |
| Butter Flavor | 1.4 oz | 0.01 |
| Partially Hydrogenated Soybean Oil (IV 85) | 137.0 | 16.0 |

A slurry of the starch base was pumped through a steam jacketed Votator, a sweep surface heat exchanger, at a 1500 lb/hour rate, and heated to 204° F. The product was then first cooled by ammonia in similar units followed by cool water, to about 100° F., and then pumped to a holding tank.

In a 150 gallon Dixie Mixer, the gum, butter flavor, and the mustard oil blend were mixed in a ½ pint portion of the formula liquid oil. Formula water was then added to the mixer, followed by the sodium benzoate, potassium sorbate, titanium dioxide (for whitening), and the salt. This was mixed for about 2 minutes. The gum was then added as a gum/liquid oil blend and mixing continued for another 2 minutes. The starch paste at 100° F., liquid egg yolk at 40° F., and the Polysorbate 60 were then added, and mixing continued for one minute. Then the vinegar and remainder of the soybean salad oil at 55° F. were added. Mixing was continued for another 2 minutes.

This mixture was then pumped by a Waukesha pump at 6000 lbs per hour through a #20 Charlotte colloid mill with rotor/stator clearance at 0.040 inches and delivered to a clean Dixie mixer. The milled base had a temperature of 80° F.

Then hot (125° F.) partially hydrogenated soybean oil (IV 85) was slowly added to the milled dressing base with good agitation. Mixing was continued for another 3 minutes, and then the mixture was pumped to the container filling device. The final dressing had a temperature of 93° F.

The proximate composition was: (a) 35 percent fat, (b) 55.3 percent moisture, (c) 4.8 percent sugar, (d) 2.3 percent salt, (e) 1.55 percent acetic acid in the water phase, and (f) a pH of 3.60.

The product produced according to this procedure passed over 15 cycles in the freeze-thaw stability and mechanical stress test detailed above.

EXAMPLE 5

In another trial, two dressings were made according to the procedure and formulation of Example 1 with one exception. One dressing was made without Polysorbate 60 to conform to the Salad Dressing Standard of Identity set by Federal Regulations.

Subsequent testing for freeze-thaw stability and resistance to mechanical stress showed that *both* products passed 25 cycles of testing. Testing was terminated at this point. This indicates the optional character of the emulsifier.

EXAMPLE 6

In another trial, the process of U.S. Pat. No. 3,093,485, Example 3, employed. However, modified starches which are not characterized as freeze-resistant (3.5 percent of National Starch 420 and 2.1% of Amioca Starch) were substituted for the specified starch.

Two preparations were made. Upon freeze-thaw mechanical stress testing, one product failed after 10 cycles; the other after 8.

This example illustrates that ordinary modified starches cannot be used in a prior art process to produce a superior emulsified dressing.

EXAMPLE 7

In two trials, the process of the present invention was employed, but the gum in the formulation (Example 1) was omitted. National starch 420 (2.20 percent) was used.

The products passed 16 and 19 cycles respectively, of freeze-thaw and resistance to mechanical stress testing.

Although the products were somewhat thin (68,000 cps at 50° F.) according to present-day salad dressing acceptability, both showed unusual stability. This indicates that the gum, in itself, is not a critical factor in the achievement of the benefits of the present invention. So a gum equivalent, in the nature of the above-mentioned starch, may be employed.

In similar fashion, acidulation may be achieved without utilizing the expressly stated vinegar of the various examples although vinegar is preferred because of its widespread acceptability. In general, the total acids, calculated as acetic acid, should be in the range of about 0.8% to about 2% of the aqueous phase.

EXAMPLE 8

Two dressings containing the ingredients specified in Example 1 were prepared. For one preparation, the process of Example 1 was followed exactly. In the second preparation, colloid milling of the dressing base was omitted. The warm, partially hydrogenated soybean oil was added slowly, with good mixing, as the last ingredient to the dressing base in the Hobart kettle.

Both dressings were filled into point screw-cap jars, refrigerated at 40° F. for 48 hours and then stored at 40° F. for several days prior to testing. Testing was then carried out according to the standardized test method described earlier. The dressing prepared according to the process described in Example 1 passed 18 cycles; whereas that prepared without colloid milling passed only 7 cycles and then the emulsion broke.

This example illustrates the criticality of colloid milling the dressing base prior to the addition of the partially hydrogenated vegetable oil. Colloid milling is a unique part of the process sequence described in this invention. Thereby, dressings with remarkable freeze-thaw stability and resistance to mechanical stress are achieved.

In the above specification, a detailed description of the nature and practice of this invention is set forth. However, this is for illustrative purposes. Variation in the details may be made by those skilled in the art without departing from the spirit and scope of the invention.

We claim:

1. A process for preparing emulsified salad dressing and the like comprising:
   (a) cooking to at least about 195° F. a starch base composed of starch and water and optionally salt, sugar and vinegar to form a starch paste, thereafter cooling said starch base to below about 100° F., said starch consituting from about 1% to about 8% of the final dressing weight,
   (b) forming an aqueous mixture containing water and gum or gum equivalent and optionally spices, natural and artificial flavors and emulsifier-stabilizers, said gum or gum equivalent constituting from about 0.05% to about 1.0% of the final dressing weight, the water in said starch base and said aqueous mixture constituting from about 30% to about 70% of the final dressing weight,
   (c) adding said starch base along with egg yolk or egg yolk equivalent to said aqueous mixture while continuing mixing, said egg yolk or egg yolk equivalent constituting from about 2% to about 10% of the final dressing weight,
   (d) adding liquid vegetable oil having a temperature in the range of about 40° F. to about 55° F. and in an amount of about 5% to about 30% of the final dressing weight to the mixture of said starch paste and said another mixture while continuing mixing to form a loose emulsion having a temperature of about 60° F. to about 90° F.,
   (e) colloid milling said loose emulsion to form a colloid-milled base,
   (f) mixing into said colloid-milled base a partially hydrogenated oil having a temperature of about 115° F. to about 130° F. and in an amount up to about 20% of the final dressing weight, and
   (g) after mixing to form a uniform composition, filling said uniform composition into containers to provide dressing having a viscosity in the range of about 50,000 to about 250,000 cps and effective to withstand at least 10 freeze-thaw and mechanical stress cycles, each cycle consisting of holding a sample in a freezer for 72 hours, thereafter storing the sample at a temperature of 65°–75° F. for five hours, rapidly stirring the sample with 25 strokes of a standard four tine kitchen fork, holding the sample at about 75° F. for one hour and inspecting the sample for the presence of free water.

* * * * *